Oct. 14, 1924.
W. S. THOMSON
SCREW DRIVER
Filed Nov. 23, 1922
1,511,434
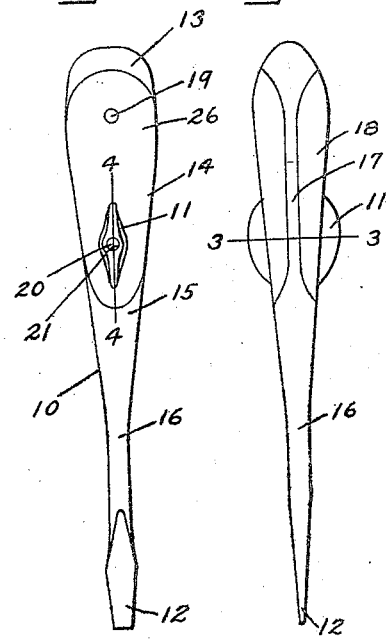
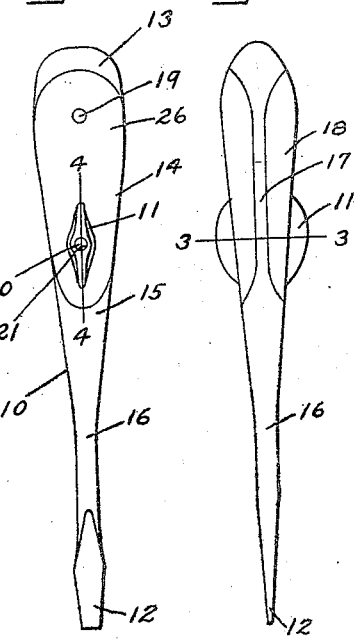
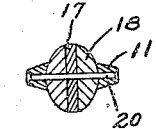
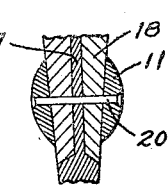
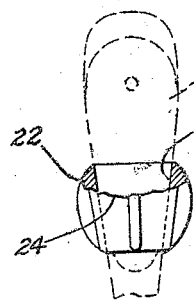
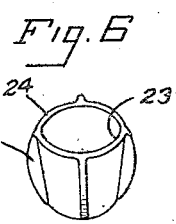
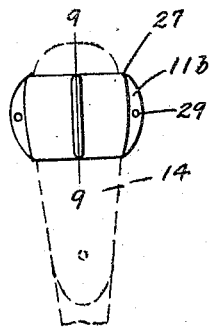
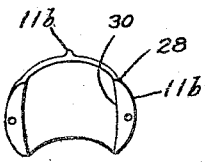
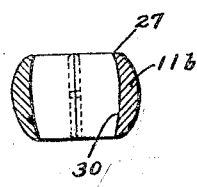
Inventor
William Stratton Thomson
By Louis M. Schmidt
Atty.

Patented Oct. 14, 1924.

1,511,434

UNITED STATES PATENT OFFICE.

WILLIAM STRATTON THOMSON, OF PLANTSVILLE, CONNECTICUT.

SCREW DRIVER.

Application filed November 23, 1922. Serial No. 602,673.

*To all whom it may concern:*

Be it known that I, WILLIAM STRATTON THOMSON, a citizen of the United States, residing at Plantsville, in the county of Hartford and State of Connecticut, have invented certain new and useful Improvements in Screw Drivers, of which the following is a specification.

My invention relates to improvements in screw-drivers of the form that is shown and described in the application filed by myself as inventor and which issued as Letters Patent No. 1,410,521, March 21, 1922, and the object of my improvement is to produce a screw-driver that has finger-engaging wings generally after the manner of the tool shown in the patent mentioned and in which the wings are provided by means of a removable piece or pieces in lieu of being integral with some part of the body structure of the screw-driver as in the patent mentioned.

In the accompanying drawing:—

Figure 1 is a side elevation of a screw-driver embodying my invention.

Figure 2 is an edge view of the same.

Figure 3 is a sectional view on the line 3—3 of Fig. 2.

Figure 4 is a sectional view on the line 4—4 of Fig. 1.

Figure 5 is a side elevation of a modified form of structure in which the wings are part of a unitary structure that is mounted on the body by means of a tapered socket form of connection, being in part broken away.

Figure 6 a perspective view of the wing structure that is shown in Fig. 5.

Figure 7 is a side elevation of another modified form of structure that differs from the form that is shown in Figs. 5 and 6 in that the wing structure is made of two parts that are secured together by means of rivets, and, also, is located at a different position on the handle.

Figure 8 is a perspective view of one of the parts of the wing structure that is shown in Fig. 7.

Figure 9 is a fragmentary longitudinal section on the line 9—9 of Fig. 7.

My improved screw-driver involves as a basal or fundamental screw-driver structure to which my improvement is applied a screw-driver structure 10 such as is shown and described in the patent granted to William S. Ward under date of August 25, 1903, No. 737,179, and the laterally projecting wings 11, in the present instance differ from those that are shown in Patent No. 1,410,521, in that they are in the form of a loose piece that is applied to said screw-driver structure 10 in any proper manner in lieu of being integral with some part of the body or screw-driver structure proper.

Said screw-driver structure 10 comprises as one piece a forging that extends continuously from the bit 12 at the lower end to the butt 13 at the upper end, said butt 13 constituting the upper end of the handle structure 14. At the lower end of the handle structure 14 is the bolster 15 of tapered form and merging downwardly with the shank 16 of circular form of cross-section. Intermediate the butt 13 and bolster 15 is a plate-like web 17. On the opposite sides of the web 17 are mounted a pair of wooden handle scales 18, being held in place by suitable rivets. A pair of rivets are used comprising the upper rivet 19 which is of the ordinary form and a lower rivet 20 which in the present instance is of special form by reason of being utilized for holding the wings 11 in place, as will be described.

The wings 11 are similar and consist each of a single piece of material of appreciable length disposed longitudinally along the handle structure 14, seated on the wooden handle scale 18, and having a hole 21 for the rivet 20, and of sufficient height to provide a rest for the finger in manipulating the tool.

The handle structure 14 adjacent the bolster 15 and the lower rivet 20 has a contour such as to provide a gentle taper in the longitudinal direction and this feature is utilized as the means for seating and securing the wing member 22 shown in Figs. 5 and 6, which is in the form of a unitary structure having a bore 23 in the form of a tapered socket that fits the parts mentioned. This form of construction permits of having a plurality of wings of any desired number, directed radially from the body portion 24 that has the socket 23. As shown, there are four such wings 11ª, arranged at ninety degree intervals.

Considering the details of the handle structure 14 further, above the bolster 15 and lower rivet 20 and intermediate these parts and the butt 13 there is a zone 26 that in the longitudinal direction is of rounded form or crowned to a slight though appreciable extent. Said zone 26 is adjacent the upper rivet and comprises the portion where there is the greatest swelling or greatest diameter. An expedient that is used to provide wings 11ᵇ for the portion of the handle structure identified by this zone 26 is to provide a wing member 27 made up of two mating parts 28 that are held in place by means of rivets 29 that secure the parts 28 together.

The united parts that form the wing member 27 have an opening whose walls 30 provide a seat of proper contour to fit over the rounded or shaped structure of the zone 26.

The division wall for the wing member 27 may be along a diametral plane that extends through two of the wings 11ᵇ, as shown.

Other forms of construction may be provided than those shown and described wherein the wing structure is in the form of a separate piece that is mounted on some part of the handle.

In all of the structures shown and described the handle structure 14 is in the form of a unitary composite structure, built up of a metal frame structure and a pair of wooden handle scales that are secured in place by means of rivets.

Also, the wing devices all in one way or another are seated to some extent upon some part of the handle scales.

I claim as my invention:—

1. In combination in the handle structure of a screw-driver, a handle frame having a web portion of plate-like form and a pair of handle scales of wood mounted on the opposite faces of said web portion, and a pair of auxiliary handle devices individually of wing-like form positioned in an axial plane and located upon opposite sides of the axis, and said plane being substantially at right angles to said web portion, whereby said handle devices make contact with and are seated upon said handle scales.

2. In a combination as described in claim 1, said auxiliary handle devices being incorporated with a body structure of sleeve-like form that operates as a collar to enclose and hold together the handle scales and web portion.

3. In combination with a screw-driver structure having a handle that merges with a bolster and has a conical form for the periphery adjacent said bolster, a wing member comprising a sleeve-like body that has a bore that is of conical form to correspond to the conical form of said periphery and is adapted to be mounted on said periphery, and said wing member having a set of radially directed wings that are adapted individually to serve as auxiliary handles.

WILLIAM STRATTON THOMSON.